Sept. 17, 1946.  W. H. CHURCHILL  2,407,815
SHIFTABLE COWLING AND LIKE SOCKET FASTENER MEMBER
Filed Sept. 14, 1942
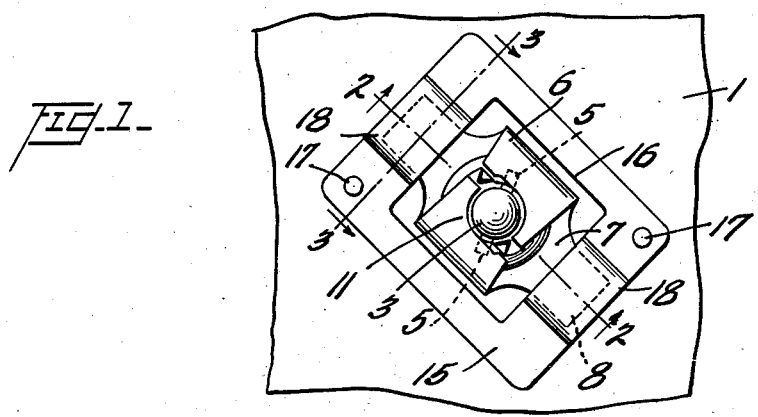
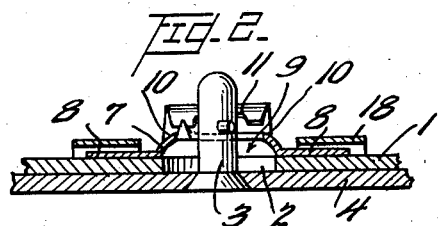
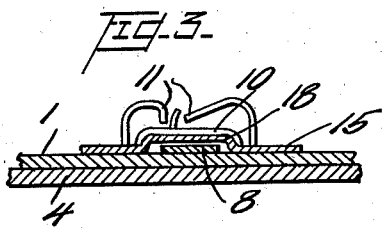
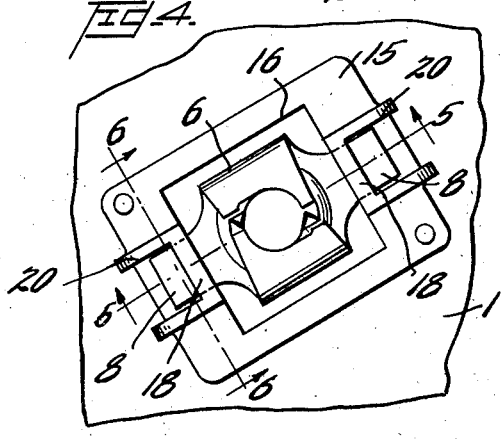
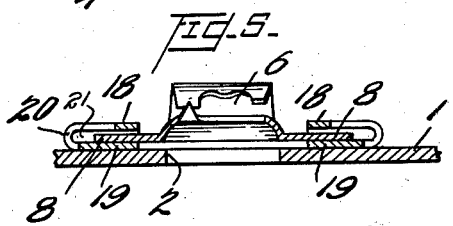
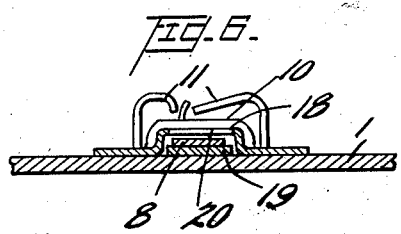
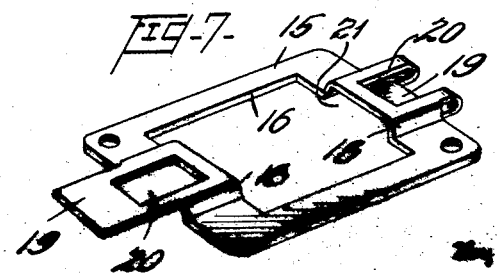
Inventor
Wilmer H. Churchill Patented Sept. 17, 1946

2,407,815

UNITED STATES PATENT OFFICE 2,407,815

SHIFTABLE COWLING AND LIKE SOCKET FASTENER MEMBER

Wilmer H. Churchill, Saugus, Mass., assignor to United-Carr Fastener Corporation, Cambridge, Mass., a corporation of Massachusetts Application September 14, 1942, Serial No. 458,239

6 Claims. (Cl. 24—221)

The present invention relates to improvements in fasteners of the rotary stud type, such as those for locking cowling and like sheets together, and aims to improve generally the construction of a shiftable fastener member therefor.

One of the primary objects of the invention is the provision of an improved mounting for a female fastening member of such cowl fasteners as will permit of shifting of the fastener member laterally with reference to the support on which it is mounted thereby facilitating assembly of the installation while permitting some flexibility of the parts secured together.

Further aims and objects of the invention will appear from the following description, reference being had to the accompanying drawing illustrating preferred embodiments of the invention.

In the drawing

Fig. 1 is a plan view of a fastener secured installation as viewed from the female fastener side thereof;

Fig. 2 is a longitudinal sectional view thereof as taken on the line 2—2 of Fig. 1;

Fig. 3 is a transverse sectional view thereof as taken on the line 3—3 of Fig. 1;

Fig. 4 is a plan view similar to Fig. 1 of a modified form of the invention;

Fig. 5 is a longitudinal sectional view thereof as taken on the line 5—5 of Fig. 4;

Fig. 6 is a transverse sectional view as taken on the line 6—6 of Fig. 4; and

Fig. 7 is a perspective view of the attaching plate shown in Figs. 4 to 6.

Referring to the drawing, the invention is illustrated as applied to a conventional type of rotary stud fastener installation, commonly used for connecting together cowling and like sheets of aircraft bodies, embodying a support 1 formed with an aperture 2 for receiving a stud member 3 rotatably mounted in a part 4 to be attached to the support 1. The stud 3 conveniently is provided with radial arms or projections 5 adapted to engage and interlock with a cam or like seat of a female fastener member or socket device 6 attached to the support 1 upon turning movement of the stud, as will be readily understood.

The female fastener member or socket device may be of any of the approved forms of sheet metal devices commonly used as socket members of cowling fasteners. Preferably the member 6 is of the type shown in the co-pending application of William A. Bedford, Jr., Serial No. 420,554, filed November 26, 1941, which has eventuated in Patent No. 2,306,928, dated December 29, 1942. It advantageously is formed of a single piece of metal having a base portion 7 preferably elongated to provide spaced bearing sections 8 at the ends and an intermediate stud-receiving aperture 9. Portions of the base surrounding the aperture 9 are dished outwardly providing a raised cam seat or embossment 10 adapted to be engaged by the arms 5 of the stud 3 when the latter is rotated a partial revolution. The female member or socket device may also be provided with integral locking means 11 overlying the cam seat 10, as disclosed in the said Bedford application above-mentioned.

According to the invention the female or socket member 6 is loosely and shiftably attached to the support 1 by means of an attaching or retainer member in such a way as to permit lateral shifting of the member 6 relative to the support aperture 2 so as to effect ready alignment between the member 6 and the stud 3 on the part 4 to be attached to the support.

Preferably the attaching member comprises a substantially rectangular plate member 15 formed with an enlarged opening 16 surrounding the support aperture 2. The end corners of the plate 15 may be apertured along a diagonal to receive a rivet 17 or the like for rigidly attaching the plate to the support.

The bearing sections 8 of the socket members 6 may have a sliding bearing directly on the support 1, as in Figs. 1, 2 and 3, in which case the end sections of the frame 15 may be outwardly bowed as at 18 providing transversely elongated open ended openings between the frame and support in which the bearing sections are slidable. The width of the openings exceeds substantially the width of the bearing sections so that the socket member is readily shiftable laterally in all directions.

It is sometimes of advantage to have the socket member and attaching member pre-assembled and applied to the support as a unit. In such case the attaching member 15 may be constructed as illustrated in Fig. 7. According to this form of the invention the upwardly bowed portion 18 is formed from a metal blank part of considerably greater length than the width of the frame, providing an integral supporting surface 19, as illustrated in the left-hand side of Fig. 7. The body of the portion 18 is formed with an enlarged opening 20 so that when the supporting surface is bent under the side of the frame, as illustrated in the right-hand side of Fig. 7 and in Fig. 5, an open ended recess 21 is provided. The portion 19 lies in the plane of the frame 15 and provides a supporting surface for the bearing sections.

It will be clear that the socket member and attaching member may be pre-assembled prior to attachment of the parts to the support merely by positioning the socket 6 within the opening 16, with one of the bearing sections inserted in the opening formed between the bowed portion and the underlying supporting surface 19. The opposite bearing section 8 may then be positioned in the other recess under the opposite bowed portion 18 and its attached portion 19 bent under the bearing section 8. The parts may then be pre-assembled and applied to the support 1 as a unit.

While I have illustrated and described preferred embodiments of my invention I do not wish to be limited thereby, the scope of my invention being best defined by the following claims.

I claim:

1. A shiftable socket fastener member for attachment to an apertured support comprising a stud-receiving socket having an elongated base with an aperture and a raised stud-engaging seat adjacent said aperture, the opposite end portions of said base being of less width than the intermediate portions of the base and constituting bearing sections, and a plate-like attaching member adapted to be securely attached to a support and having an aperture adapted to be aligned with the aperture of the stud-receiving socket in any of the shiftable positions, portions of said member on diametrically opposite sides of the aperture thereof being outwardly dished providing recesses for loosely receiving and confining said narrow bearing extensions, and portions of said member extending under said outwardly dished portions and constituting supporting members upon which said bearing extensions are adapted to slidably bear and maintain said member and socket in shiftable assembled relation prior to attachment of the fastener to a support.

2. A shiftable socket fastener member for attachment to an apertured support comprising a stud-receiving socket having an elongated base with an aperture and a raised stud-engaging seat adjacent said aperture, the opposite end portions of said base being of less width than the rest of the base and constituting bearing sections, and a plate-like attaching member adapted to be securely attached to a support and having an aperture aligned with said socket aperture, portions of said member on diametrically opposite sides of said aperture extending into overlapping relation to provide recesses for loosely receiving and confining said narrow bearing sections in shiftable assembled relation prior to attachment of the fastener member to the support.

3. A shiftable socket fastener member comprising an attaching plate member having a relatively large central opening and a marginal flange surrounding said opening by means of which the attaching plate member may be secured to an apertured support, and an elongated stud-engaging member adapted to be shiftably maintained in operative stud-engaging position by said attaching plate member and including a centrally apertured stud-engaging portion and end bearing extensions, said attaching plate member having spaced superposed portions disposed on opposite sides of said end bearing extensions and providing recesses opening into and disposed in the plane of the aperture of the attaching plate member for shiftably receiving the bearing extensions of the stud-engaging member.

4. A shiftable socket member comprising an attaching plate member having a relatively large opening and surrounding marginal flange by means of which the plate member may be securely fastened to an apertured support, portions of said marginal flange on diametrically opposite sides of said aperture being outwardly offset forming therewith a recess disposed in the plane of and in communication with said opening, a stud-receiving socket member having an apertured base and an outwardly disposed stud-engaging seat extending through the opening of the plate member, said socket member having bearing sections on opposite sides of said seat positioned in said recesses and being of less area than said recesses whereby the socket member is freely shiftable relative to said plate member.

5. A shiftable socket fastener member comprising an attaching plate member having a relatively large central opening and a marginal flange surrounding said opening by means of which the attaching plate member may be secured to an apertured support, and an elongated stud-engaging member adapted to be shiftably maintained in operative stud-engaging position by said attaching plate member including a base and an outwardly disposed stud-engaging seat extending through the opening in the attaching plate member, said attaching plate member including oppositely disposed spaced superposed portions disposed above and below portions of the socket member for shiftably confining the base of the socket member substantially in the plane of the marginal flange of the attaching plate member and inwardly of the plane of the stud-engaging seat.

6. A shiftable socket fastener for attachment to an apertured support, comprising a stud-receiving socket having an elongated base provided with an aperture and a raised stud-engaging seat adjacent said aperture, the opposite end portions of said base being of less width than the rest of the base and constituting bearing extensions, a plate-like attaching member adapted to be securely attached to a support and having an aperture through which said stud-receiving socket members extend, portions of said member on diametrically opposite sides of said aperture extending outward, over and backward to provide recesses for loosely receiving and confining said bearing extensions, said backward extending portions constituting supporting members upon which said bearing sections are adapted to slidably bear, said backward extending portions also maintaining said member and socket in shiftable assembled relation prior to attachment of the fastener to a support.

WILMER H. CHURCHILL.